US011014565B2

(12) United States Patent
Mueller

(10) Patent No.: US 11,014,565 B2
(45) Date of Patent: May 25, 2021

(54) START-STOP DEVICE FOR BRINGING ABOUT AN AUTOMATIC SWITCH-OFF AND/OR SWITCH-ON OPERATION OF AN INTERNAL COMBUSTION ENGINE OF A MOTOR VEHICLE

(71) Applicant: Bayerische Motoren Werke Aktiengesellschaft, Munich (DE)

(72) Inventor: Steffen Mueller, Icking (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/592,329

(22) Filed: Oct. 3, 2019

(65) Prior Publication Data
US 2020/0031355 A1 Jan. 30, 2020

Related U.S. Application Data
(63) Continuation of application No. PCT/EP2018/058736, filed on Apr. 5, 2018.

(30) Foreign Application Priority Data
Apr. 6, 2017 (DE) ...................... 10 2017 205 895.1

(51) Int. Cl.
*G06G 7/70* (2006.01)
*B60W 30/192* (2012.01)
(Continued)

(52) U.S. Cl.
CPC .... *B60W 30/192* (2013.01); *B60W 30/18018* (2013.01); *B60W 30/18063* (2013.01);
(Continued)

(58) Field of Classification Search
CPC ......... B60W 30/192; B60W 30/18018; B60W 30/18063; B60W 30/18072;
(Continued)

(56) References Cited

U.S. PATENT DOCUMENTS 4,975,845 A * 12/1990 Mehta ................. F16H 61/0206
192/3.31
6,275,761 B1 * 8/2001 Ting ...................... F16H 61/143
701/51
(Continued)

FOREIGN PATENT DOCUMENTS

DE 100 23 331 A1 6/2001
DE 10 2008 061 790 A1 7/2010
(Continued)

OTHER PUBLICATIONS

International Search Report (PCT/ISA/210) issued in PCT Application No. PCT/EP2018/058736 dated Jul. 18, 2018 with English translation (six (6) pages).
(Continued)

*Primary Examiner* — Hung Q Nguyen
*Assistant Examiner* — Anthony Donald Taylor, Jr.
(74) *Attorney, Agent, or Firm* — Crowell & Moring LLP

(57) ABSTRACT

A start-stop device and a corresponding method brings about an automatic switch-off and/or switch-on operation of an automatically switched-off drive machine of a motor vehicle, in particular of a motor vehicle having an automatic transmission. The start-stop device has a switch-off logic, by way of which an automatic switch-off of the drive machine can be brought about in the case of a moving vehicle in accordance with a predefined switch-off operating strategy, and a switch-on logic, by way of which an automatic switch-on of the automatically switched-off drive machine can be brought about in accordance with a predefined switch-on operating strategy. The switch-off operating strategy and/or the switch-on operating strategy are/is configured in a manner which is based on wheel torque.

8 Claims, 3 Drawing Sheets

(51) Int. Cl.
  *B60W 30/18* (2012.01)
  *F02N 11/08* (2006.01)
(52) U.S. Cl.
  CPC ... *B60W 30/18072* (2013.01); *F02N 11/0822* (2013.01); *F02N 11/0833* (2013.01); *F02N 11/0837* (2013.01); *B60W 2510/104* (2013.01); *B60W 2510/1005* (2013.01); *B60W 2510/18* (2013.01); *B60W 2520/10* (2013.01); *B60W 2520/30* (2013.01); *B60W 2552/15* (2020.02); *F02N 2200/022* (2013.01); *F02N 2200/0801* (2013.01); *F02N 2200/0802* (2013.01); *F02N 2200/10* (2013.01); *F02N 2200/124* (2013.01)
(58) Field of Classification Search
  CPC ... B60W 2510/1005; B60W 2510/104; B60W 2510/18; B60W 2520/10; B60W 2520/30; B60W 2550/142; F02N 11/0822; F02N 11/0833; F02N 11/0837; F02N 2200/022; F02N 2200/0801; F02N 2200/0802; F02N 2200/10; F02N 2200/124
  USPC .......................................................... 701/102
  See application file for complete search history.

(56) References Cited

U.S. PATENT DOCUMENTS

| | | | | |
|---|---|---|---|---|
| 2005/0211479 | A1* | 9/2005 | Tamor | B60K 6/48 180/65.25 |
| 2011/0054765 | A1 | 3/2011 | Lewis et al. | |
| 2011/0190095 | A1* | 8/2011 | Bollig | F02N 11/0822 477/203 |
| 2011/0238284 | A1* | 9/2011 | Bollig | B60W 10/06 701/113 |
| 2013/0116903 | A1* | 5/2013 | Lenz | G06F 17/00 701/68 |
| 2013/0296132 | A1* | 11/2013 | Doering | B60K 6/48 477/86 |
| 2014/0303823 | A1* | 10/2014 | Nakanishi | B60K 6/48 701/22 |
| 2014/0336890 | A1* | 11/2014 | Kresse | F16H 61/68 701/60 |
| 2015/0046050 | A1* | 2/2015 | Christen | B60W 10/02 701/67 |
| 2015/0119189 | A1* | 4/2015 | Okubo | B60W 10/06 477/3 |
| 2015/0203117 | A1* | 7/2015 | Kelly | B60K 31/02 701/91 |
| 2016/0304095 | A1 | 10/2016 | Fischer | |
| 2016/0304096 | A1* | 10/2016 | Khafagy | B60W 30/18109 |
| 2019/0061768 | A1 | 2/2019 | Bodendorf et al. | |

FOREIGN PATENT DOCUMENTS

| | | |
|---|---|---|
| DE | 10 2010 034 554 A1 | 3/2011 |
| DE | 10 2011 080 172 A1 | 2/2013 |
| DE | 10 2011 085 395 A1 | 5/2013 |
| DE | 10 2012 206 135 A1 | 10/2013 |
| DE | 10 2012 217 899 A1 | 6/2014 |
| DE | 20 2014 000 919 U1 | 7/2015 |
| DE | 10 2015 206 658 A1 | 10/2016 |
| DE | 10 2016 106 864 A1 | 10/2016 |
| DE | 10 2016 207 280 A1 | 11/2017 |

OTHER PUBLICATIONS

German-language Written Opinion (PCT/ISA/237) issued in PCT Application No. PCT/EP2018/058736 dated Jul. 18, 2018 (six (6) pages).

German-language Office Action issued in counterpart German Application No. 10 2017 205 895.1 dated Nov. 8, 2017 with partial English translation (10 pages).

\* cited by examiner

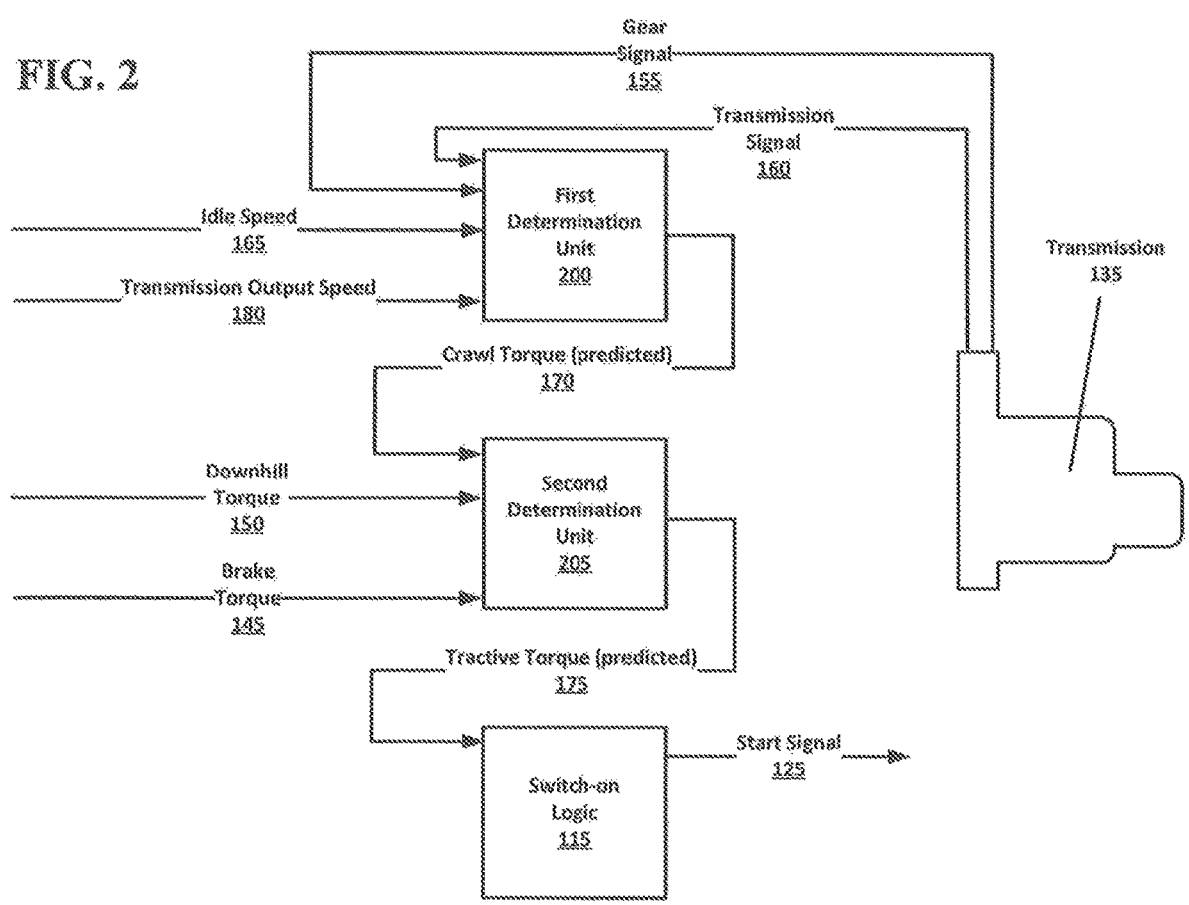

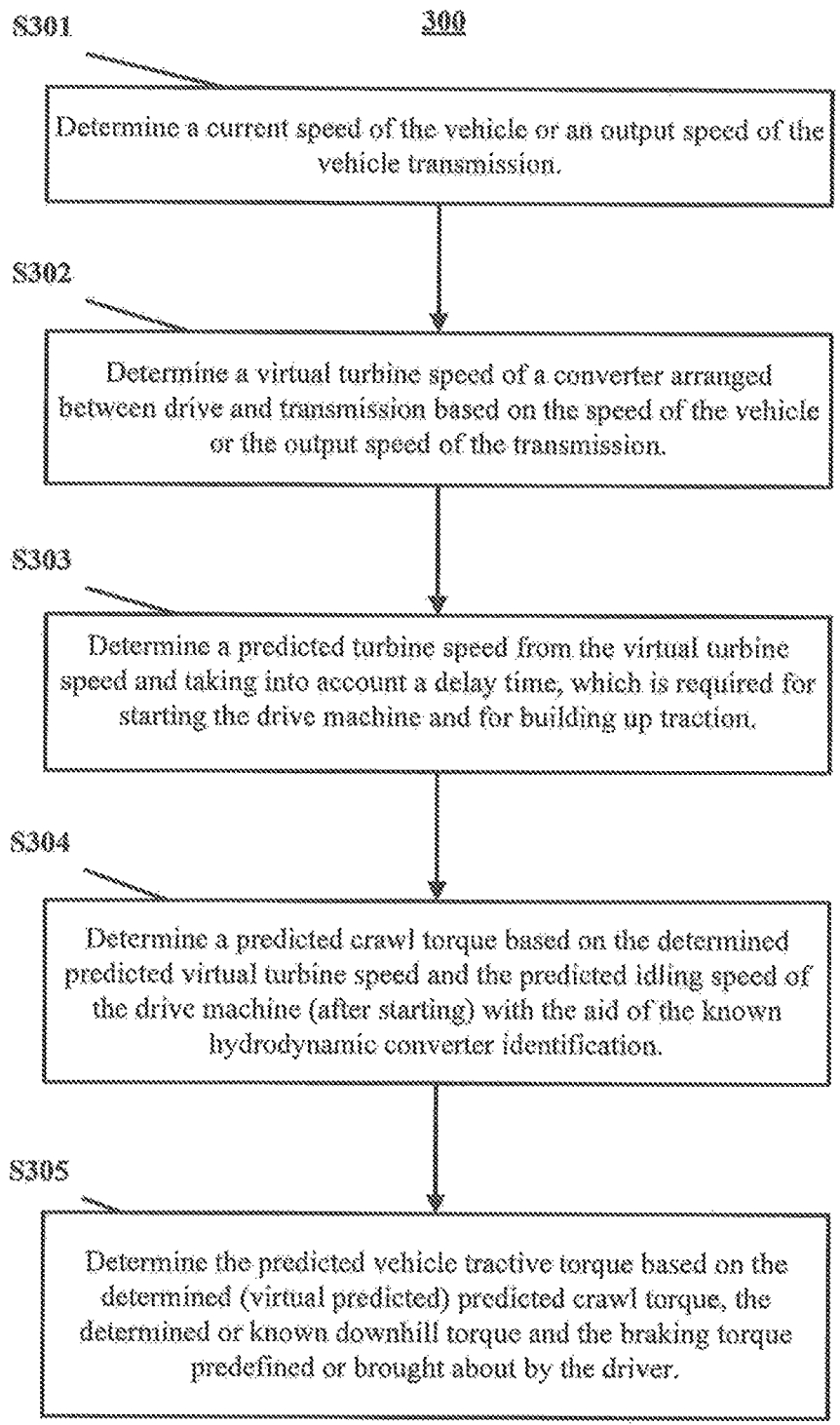

START-STOP DEVICE FOR BRINGING ABOUT AN AUTOMATIC SWITCH-OFF AND/OR SWITCH-ON OPERATION OF AN INTERNAL COMBUSTION ENGINE OF A MOTOR VEHICLE

CROSS REFERENCE TO RELATED APPLICATIONS

This application is a continuation of PCT International Application No. PCT/EP2018/058736, filed Apr. 5, 2018, which claims priority under 35 U.S.C. § 119 from German Patent Application No. 10 2017 205 895.1, filed Apr. 6, 2017, the entire disclosures of which are herein expressly incorporated by reference.

BACKGROUND AND SUMMARY OF THE INVENTION

The invention relates to a start-stop device and a corresponding method for bringing about an automatic switch-off operation and/or switch-on operation of a drive machine in a motor vehicle.

In principle, internal combustion engines are usually switched off manually by means of an ignition key by the driver. A method, which is presented in DE 100 23 331 A1, forms an exception. In this case, the brake pedal position or the brake pedal pressure is used instead of the ignition key. The switch-off process of the internal combustion engine is initiated if, after the motor vehicle has come to a standstill, the brake pedal is actuated more strongly in its already actuated position. To travel further, the brake pedal is released and the gas pedal is pressed, after which a starting of the internal combustion engine is initiated. A disadvantage with such methods is that only the driver is responsible for switching off the internal combustion engine. Analyses of present-day driving behavior show that despite an increased environmental awareness and increased fuel prices, a manual switch-off of the internal combustion engine, e.g. at traffic lights, is rarely accomplished independently.

In order to reduce fuel consumption and pollutant emissions, at the present time methods and systems are already in use in many vehicles, which automatically switch off the internal combustion engine of a motor vehicle when the vehicle is at a standstill under certain conditions or in the presence of predefined switch-off conditions, and automatically switch on again in the presence of predefined switch-on conditions. Such methods and systems or start-stop devices are particularly suitable for city traffic to reduce fuel consumption, since in city traffic the vehicle frequently comes to a stop at traffic lights or as a result of traffic and operation of the internal combustion engine is not necessary.

Such a method is known, for example, from DE 10 2008 061 790 A1. In this case, the internal combustion engine is automatically switched off when the vehicle is braked to a standstill and is held at a standstill by actuation of the brake pedal. The internal combustion engine is started by releasing the brake pedal. Furthermore, an automatic starting of the previously automatically switched-off internal combustion engine can be prevented here by releasing the brake pedal if the brake pedal is depressed harder with the internal combustion engine switched off. A renewed starting then only takes place when the gas pedal is actuated or if, by means of a foot well monitoring unit, an imminent actuation of the gas pedal is identified.

Known from DE 10 2012 217 899 A1 is a method for automatically switching off and starting a drive machine by means of a start-stop device, which switches off the drive machine at speeds greater than zero, when the gas pedal is released or will be released and no (imminent) brake pedal actuation is identified or presumed, and which then starts the automatically switched-off drive machine again when, by means of a foot well monitoring unit, an imminent gas pedal actuation or brake pedal actuation is identified or presumed.

Furthermore known from DE 10 2010 034 554 A1 is a system for switching off and starting a motor, wherein the motor is switched off during travel, when the speed is less than a predefined limiting speed and the brake pedal is actuated. The motor is then always started again when the foot of the driver has released the brake and/or when the throttle position is greater than zero.

Known from the subsequently published DE 10 2016 207 280 A1 is a system for bringing about an automatic switch-on process of a drive machine which has been switched off when the vehicle is traveling, wherein the starting of the drive machine is accomplished depending on a desired driving dynamic identified by the driver, which, for example, is deduced from the release speed of the brake pedal.

It is now the object of the invention to provide an improved system with regard to comfort, which brings about in a simple and cost-effective manner, an automatic switch-off and switch-on of a drive machine which had previously been switched off automatically when the vehicle was traveling.

In the start-stop device according to the invention for bringing about an automatic switch-off and/or switch-on operation of an automatically switched-off drive machine of a motor vehicle, in particular of a motor vehicle having an automatic transmission, it is initially assumed that the start-stop device comprises switch-off logic, by which an automatic switch-off of the drive machine can be brought about in the case of a moving vehicle, i.e. at speeds greater than zero, in particular at speeds up to 3 km/h, 10 km/h, 15 km/h, or even up to 30 km/h, in accordance with a predefined switch-off operating strategy. Furthermore, the start-stop device comprises switch-on logic, by which an automatic switch-on of the automatically switched-off (when the motor vehicle is moving) drive machine (when the motor vehicle is still moving) can be brought about in accordance with a predefined switch-on operating strategy.

Possible switch-off logic, by which an automatic switch-off of the drive machine can be brought about when the vehicle is traveling, can be configured in such a manner that an automatic switch-off of the drive machine is brought about, when the operation of the relevant drive machine is not required, when neither the gas pedal nor the brake pedal are actuated or when a (defined) brake pedal actuation is detected. A (defined) brake pedal actuation can, for example, be a sufficient brake pedal actuation. In order to identify a sufficient brake pedal actuation, for example, the brake pedal position and/or the applied braking pressure, and/or the braking torque brought about when actuating the brake pedal can be evaluated. As a further requirement for bringing about an automatic switch-off process, it can, for example, be provided that the speed of the vehicle must be less than a fixedly or variable defined speed threshold (e.g. 50 km/h, 30 km/h, 15 km/h, or even 5 km/h) before an automatic switch-off process can basically be brought about. The term drive machine can be understood as any drive machine, which provides the force for driving the vehicle. In particular, it can comprise an internal combustion engine.

The invention is further based on the finding that in the case of a drive machine automatically switched off during travel, upon actuation of the brake pedal, a bringing about of a renewed starting of the drive machine when releasing the brake is not always consistent with the driver's wish or is not appropriate for reasons of energy efficiency. If an automatic starting of the drive machine with the vehicle moving seems desirable or appropriate, at the present time there is no suitable operating strategy to enable a gentle transition into crawling at low speeds.

The basic idea of the invention is now to provide a start-stop device, which is adapted to bring about an automatic switch-off of the drive machine and/or switch-on of the drive machine, which has been automatically switched off when the motor vehicle is moving, as the vehicle continues to move in such a manner that transitions taking place between rolling and creeping take place as comfortably as possible.

In order to be able to provide a system, which follows the basic idea, it is provided according to the invention that in a start-stop device explained above, it is provided that the switch-off operating strategy and/or the switch-on operating strategy is configured in a manner, which is based on wheel torque. In other words, the decision to bring about an automatic switch-off and/or switch-on process of a drive machine is based on a determined (current or future or required) wheel torque.

In analogous application of the basic idea to a corresponding method for bringing about an automatic switch-off and/or switch-on operation of an automatically switched-off drive machine of a motor vehicle, in particular of a motor vehicle having an automatic transmission, wherein an automatic switch-off of the drive machine when the vehicle is moving can be brought about according to a predefined switch-off operating strategy and an automatic switch-on of the automatically switched-off (when the vehicle is moving) drive machine (when the motor vehicle is still moving) can be brought about according to a predefined switch-on operating strategy, it is provided that the switch-off operating strategy and/or the switch-on operating strategy is configured in a manner, which is based on wheel torque.

Advantageous further developments of the device according to the invention apply in corresponding manner also to the method according to the invention.

Advantageously, the switch-off operating strategy, for example, is configured in such a manner that it takes into account present or determinable information relating to a crawl torque or vehicle tractive torque, which is current or applied before actuation of the brake pedal and/or predicted, and/or a current and/or predicted downhill torque and/or a predicted wheel torque when the drive machine is switched off and/or a current and/or predicted braking torque when the decision is made to bring about an automatic switch-off process. Thus, for example, before bringing about an automatic switch-off process, it is determined whether a switch-off of the drive machine as a result of current or predicted operating conditions of the motor vehicle seems appropriate with regard to comfort and/or energy efficiency. If a switch-off does not seem appropriate, a switch-off is not brought about.

In a particularly advantageous embodiment of the invention, the switch-on operating strategy is configured in such a manner that this takes into account present or determinable information relating to a predicted crawl torque (after bringing about an automatic switch-on process), a predicted vehicle tractive torque, a current or predicted downhill torque, and/or a current and/or predicted braking torque when the decision is made to bring about an automatic switch-on process of the drive machine, in particular when the vehicle is moving. By taking into account the current and/or predicted torques, which act on a wheel 210 of the motor vehicle, it can be determined substantially more accurately whether and when an automatic starting of the drive machine is appropriate and should be brought about. The predicted vehicle tractive torque differs from the predicted crawl torque in that, in addition to the torque caused by the drive machine, other factors or torques, which influence the advance of the vehicle, such as, for example, a downhill torque, are also taken into account in the vehicle tractive torque.

In a further advantageous embodiment of the invention, the switch-on operating strategy is configured to bring about an automatic start of the drive machine when it is established that the current braking torque of the motor vehicle is at least no smaller than the value of a predicted vehicle tractive torque when an automatic switch-on of the drive machine is brought about. The predicted crawl torque and/or the predicted vehicle tractive torque, which can advantageously be determined on the basis of the predicted crawl torque, can in this case be determined based on a determinable speed of the vehicle or a determinable output speed of the transmission, a current gear, and a determinable transmission ratio of the transmission, and with a built-in torque converter of an automatic transmission, from the hydrodynamic identification thereof. In addition, when determining the predicted crawl torque and/or the predicted vehicle tractive torque, the planned idling speed of the drive machine can be taken into account. Furthermore, when determining the predicted vehicle tractive torque, information relating to the current or predicted slope of the vehicle, in particular a determinable current and/or predicted downhill torque, can be taken into account.

In an again particularly advantageous embodiment, the predicted crawl torque can be determined as follows:

determining a current speed of the vehicle or an output speed of the vehicle transmission;

determining a virtual turbine speed of a converter arranged between drive and transmission based on the speed of the vehicle or the output speed of the transmission;

determining a predicted turbine speed, wherein the predicted turbine speed is determined from the virtual turbine speed and taking into account a delay time, which is required for starting the drive machine and for building up traction;

determining a predicted crawl torque based on the determined predicted virtual turbine speed and the predicted idling speed of the drive machine (after starting) with the aid of the known hydrodynamic converter identification; and determining the predicted vehicle tractive torque based on the determined (virtual predicted) predicted crawl torque, the determined or known downhill torque and the braking torque predefined or brought about by the driver.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows an exemplary structure of a wheel-torque-based switch-on operating strategy according to the invention.

FIG. 3 shows a flowchart of a method according to an embodiment of the invention for bringing about an automatic switch-off and/or switch-on process of a drive machine.

DETAILED DESCRIPTION OF THE DRAWINGS

Figure 1:
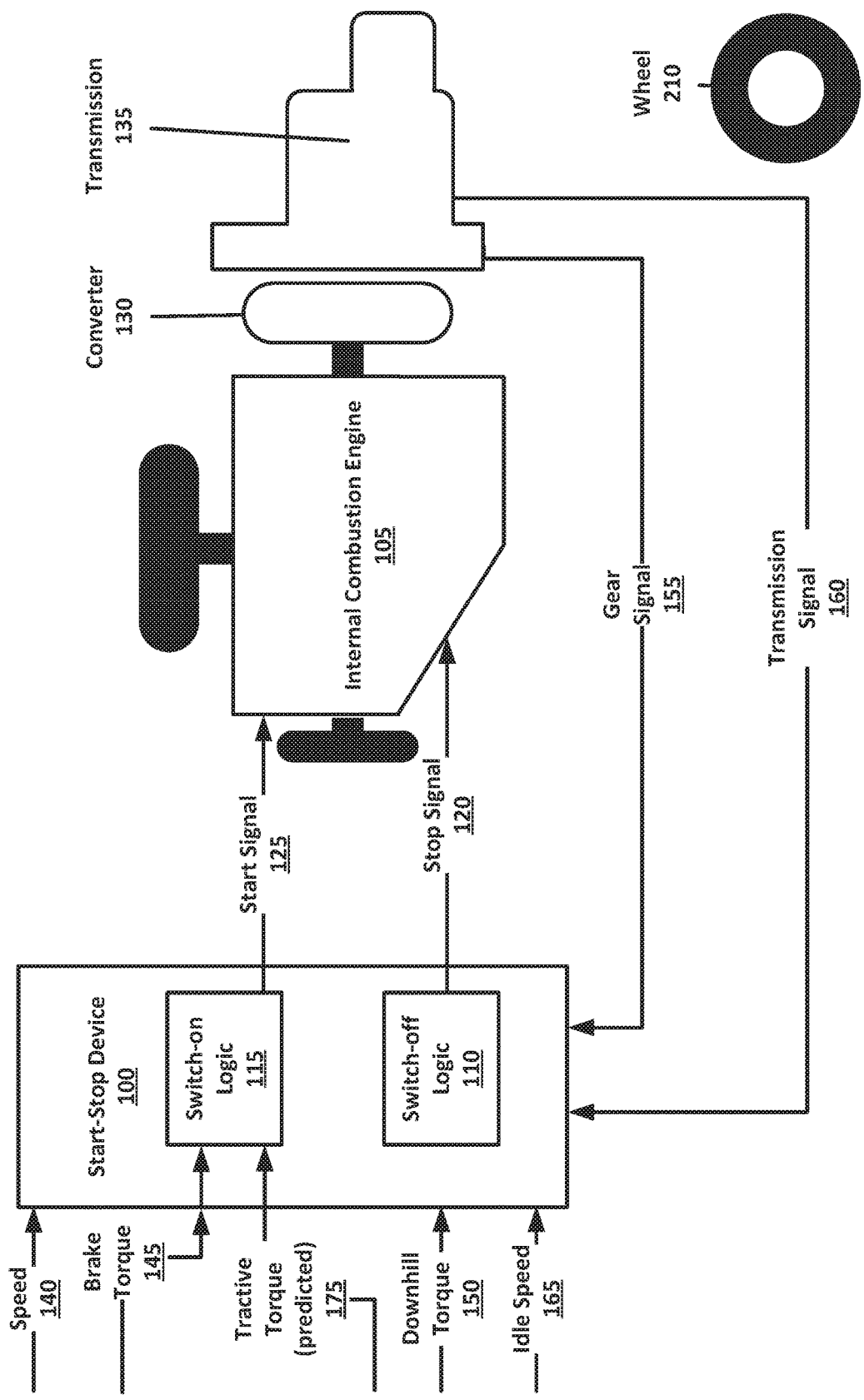
FIG. 1 shows a structure of a start-stop device according to an embodiment of the invention for bringing about an automatic switch-off and/or switch-on process of a drive machine.

FIG. 1 shows in detail a start-stop device 100, which is adapted, by emitting a stop signal 120, to bring about an automatic switch-off process of an internal combustion engine 105 of a motor vehicle with automatic transmission 135, not shown in detail here, when the motor vehicle is moving. The start-stop device 100 is also adapted, by emitting a start signal 125, to bring about a switch-on process of the internal combustion engine 105 of the motor vehicle, which has been automatically switched off when the motor vehicle is moving. The internal combustion engine 105 of the motor vehicle not shown in detail here can either be the single drive machine 105 of the motor vehicle or one of at least two drive machines 105, such as is the case, for example, with hybrid vehicles.

The start-stop device 100 receives, inter aha, the following signals in order to be able to decide on the time of bringing about an automatic switch-off and/or switch-on of the previously automatically switched off drive machine 105:
- a speed signal 140 from the vehicle,
- a brake torque signal 145,
- a current or predicted downhill torque signal 150,
- a gear signal 155, which provides information relating to the gear currently engaged, and
- a transmission signal 160 of the transmission 135, and an idle speed signal 165 relating to the predicted idling speed.

The start-stop device 100 can be adapted to calculate, taking into account the incoming signals when the drive machine 105 is switched off, based on the wheel torque, a predicted vehicle tractive torque 175, which would be established when the internal combustion engine 105 was switched off.

The start-stop device 100 further comprises switch-off logic 110, by which an automatic switch-off of the internal combustion engine 105 when the vehicle is moving can be brought about in accordance with a predefined switch-off operating strategy and switch-on logic 115, by which an automatic switch-on of the internal combustion engine 105, which has been automatically switched off with the vehicle moving, can be brought about in accordance with a predefined, wheel-torque-based switch-on operating strategy.

The switch-on logic 115 can be configured in such a nrr determines, taking into account the predicted vehicle tractive torque 175, whether and when an automatic switch-on of the drive machine 105 should be brought about.

FIG. 2 shows a possible configuration of the switch-on operating strategy including a wheel-torque-based determination of the predicted crawl torque 170, by way of which an automatic starting of the internal combustion engine 105 and a gentle transition into an automatic crawl can be brought about.

In this case, the output speed 180 of the transmission 135 is determined from the speed signal 140 from the vehicle. Firstly, in a first determination unit 200, a virtual predicted crawl torque (on the level) 170 is determined from the determined output speed 180, the planned gear 155 to be engaged, the planned idling speed 165, and the transmission signal 160 of the transmission 135. Taking into account the virtual predicted crawl torque 170, a determined current or predicted downhill torque 150 and a determined braking torque 145 actuated by the driver, the actually predicted vehicle tractive torque 175, which would occur if the drive machine 105 were switched on (and there was no gas pedal actuation) is then determined in a second determination unit 205.

This predicted vehicle tractive torque 175 is supplied as an input signal to the switch-on logic 115. The switch-on logic 115 decides on the basis of the vehicle tractive torque 175 or on the basis of the previously determined predicted crawl torque 170, the current braking torque 145, and the downhill torque 150, whether to bring about an automatic switch-on process of the drive machine 105. Thus, an automatic switch-on of the drive machine 105 is brought about by emitting a start signal 125 when the current braking torque 145 is greater than the value of the predicted vehicle tractive torque 175 when the drive machine 105 is switched on.

FIG. 3 is a flowchart illustrating a method 300 for determining the predicted crawl torque 170. In 5301, a current speed 140 of the vehicle or an output speed 180 of the vehicle transmission 135 is determined. In 5302, a virtual turbine speed of a converter 130 arranged between drive machine 105 and transmission 135 is determined based on the speed 140 of the vehicle or the output speed 180 of the transmission 135. In 5303, a predicted turbine speed is determined, from the virtual turbine speed and taking into account a delay time, which is required for starting the drive machine 105 and for building up traction. In 5304, a predicted crawl torque 170 based on the determined predicted virtual turbine speed and the predicted idling speed of the drive machine 105 (after starting) is determined with the aid of the known hydrodynamic converter identification. In 5305, the predicted vehicle tractive torque 175 is determined based on the determined (virtual predicted) predicted crawl torque 170, the determined or known downhill torque 150 and the braking torque 145 predefined or brought about by the driver.

By means of the start-stop device proposed here, configured according to the invention, a comfortable, intuitive, and driving-physically appropriate transition from the motor stop state into crawl can be brought about in a simple and cost-effective manner. This also has a positive effect on the $CO_2$ balance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A start-stop device for bringing about an automatic switch-off or switch-on operation of a drive machine of a motor vehicle, comprising:
   switch-off logic, by way of which the automatic switch-off operation of the drive machine is carried out in accordance with a predefined switch-off operating strategy when the motor vehicle is moving; and
   switch-on logic, by way of which the automatic switch-on operation of the drive machine is carried out in accordance with a predefined switch-on operating strategy, wherein at least one of the switch-off operating strategy and the switch-on operating strategy is based on a wheel torque determined from one or more signals of the motor vehicle and/or a transmission of the motor vehicle;

the switch-off operating strategy takes into account present or determinable information relating to:
- a current or predicted vehicle tractive torque,
- a current or predicted crawl torque,
- a current or predicted downhill torque,
- a predicted wheel torque, and/or
- a current or predicted braking torque of the motor vehicle, when a decision is made to bring about the automatic switch-off operation;

the switch-on operating strategy takes into account present or determinable information relating to:
- the predicted vehicle tractive torque,
- the predicted crawl torque,
- the current or predicted downhill torque, and/or
- the current or predicted braking torque of the motor vehicle, when a decision is made to bring about the automatic switch-on operation; and the switch-on operating strategy is configured to bring about an automatic start of the drive machine when it is established that the current braking torque of the motor vehicle is no smaller than a value of the predicted vehicle tractive torque.

2. The start-stop device according to claim 1, wherein the predicted vehicle tractive torque is determinable based on the predicted crawl torque, and wherein the predicted crawl torque is determinable based on an output speed of the transmission, a planned gear of the transmission to be engaged, or a planned idling speed of the drive machine.

3. The start-stop device according to claim 1, wherein the predicted vehicle tractive torque is determinable based on information relating to a current or predicted slope of the vehicle.

4. The start-stop device according to claim 3, wherein the predicted vehicle tractive torque is determinable based on the current or predicted downhill torque.

5. The start-stop device according to claim 1, wherein the predicted vehicle tractive torque is determined as follows:
- determining a current speed of the vehicle or an output speed of the transmission;
- determining a virtual turbine speed of a converter arranged between the drive machine and the transmission based on the current speed of the vehicle or the output speed of the transmission and a planned gear of the transmission to be engaged;
- determining a predicted turbine speed, wherein the predicted turbine speed is determined from the virtual turbine speed and based on a delay time which is required for starting the drive machine and building up traction;
- determining the predicted crawl torque based on the predicted turbine speed and a planned idling speed of the drive machine and optionally based on the current or predicted downhill torque acting on at least one wheel of the motor vehicle; and
- determining the predicted vehicle tractive torque based on the predicted crawl torque, the current or predicted downhill torque, and the current or predicted braking torque of the motor vehicle.

6. The start-stop device according to claim 1, wherein the transmission of the motor vehicle is an automatic transmission.

7. A method for bringing about an automatic switch-off or switch-on operation of a drive machine of a motor vehicle having an automatic transmission, the method comprising:
- bringing about the automatic switch-off operation of the drive machine according to a predefined switch-off operating strategy when the motor vehicle is moving; and
- bringing about the automatic switch-on operation of the drive machine according to a predefined switch-on operating strategy, wherein the switch-off operating strategy and/or the switch-on operating strategy is based on a wheel torque determined from one or more signals of the motor vehicle and/or the automatic transmission of the motor vehicle;

the switch-off operating strategy takes into account present or determinable information relating to:
- a current or predicted vehicle tractive torque,
- a current or predicted crawl torque,
- a current or predicted downhill torque,
- a predicted wheel torque, and/or
- a current or predicted braking torque of the motor vehicle, when a decision is made to bring about the automatic switch-off operation;

the switch-on operating strategy takes into account present or determinable information relating to:
- the predicted vehicle tractive torque,
- the predicted crawl torque,
- the current or predicted downhill torque, and/or
- the current or predicted braking torque of the motor vehicle, when a decision is made to bring about the automatic switch-on operation; and the switch-on operating strategy is configured to bring about an automatic start of the drive machine when it is established that the current braking torque of the motor vehicle is no smaller than a value of the predicted vehicle tractive torque.

8. A start-stop device for bringing about an automatic switch-off or switch-on operation of a drive machine of a motor vehicle, comprising:
- switch-off logic, by way of which the automatic switch-off operation of the drive machine is carried out in accordance with a predefined switch-off operating strategy when the motor vehicle is moving; and
- switch-on logic, by way of which the automatic switch-on operation of the drive machine is carried out in accordance with a predefined switch-on operating strategy, wherein each of the switch-off operating strategy and the switch-on operating strategy are based on a wheel torque determined from one or more signals of the motor vehicle and/or a transmission of the motor vehicle;

the switch-off operating strategy takes into account present or determinable information relating to:
- a current or predicted vehicle tractive torque,
- a current or predicted crawl torque,
- a current or predicted downhill torque,
- a predicted wheel torque, and/or
- a current or predicted braking torque of the motor vehicle, when a decision is made to bring about the automatic switch-off operation;

the switch-on operating strategy takes into account present or determinable information relating to:
- the predicted vehicle tractive torque,
- the predicted crawl torque,
- the current or predicted downhill torque, and/or the current or predicted braking torque of the motor vehicle, when a decision is made to bring about the automatic switch-on operation; and the switch-on operating strategy is configured to bring about an automatic start of the drive machine when it is established that the current braking torque of the motor vehicle is no smaller than a value of the predicted vehicle tractive torque.

* * * * *